US005509808A

United States Patent [19]
Bell

[11] Patent Number: 5,509,808
[45] Date of Patent: Apr. 23, 1996

[54] TOY TOILET TRAINING KIT

[76] Inventor: Samantha Bell, 80 Robinwood Dr., Little Rock, Ark. 72207

[21] Appl. No.: 195,715
[22] Filed: Feb. 14, 1994
[51] Int. Cl.$^6$ ..................................................... G09B 19/00
[52] U.S. Cl. ........................... 434/247; 446/305; 446/268
[58] Field of Search ................................... 434/247, 256, 434/258, 236; 446/305, 268

[56] References Cited

U.S. PATENT DOCUMENTS

| 3,775,901 | 12/1973 | Ellman et al. | 446/305 X |
| 4,413,441 | 11/1983 | Hunter et al. | |
| 4,955,844 | 9/1990 | Miller, Jr. | 446/268 X |
| 5,285,540 | 2/1994 | Putz . | |
| 5,363,516 | 11/1994 | Butts | 434/247 X |

Primary Examiner—Gene Mancene
Assistant Examiner—Jeffrey A. Smith
Attorney, Agent, or Firm—Timothy J. Martin

[57] ABSTRACT

A toy toilet training system utilizes a kit to teach children toilet skills. The kit includes a doll that receives a fluid, such as water, through a mouth opening and can discharge the fluid from an outlet to simulate urination. A toy toilet, sized in proportion to the doll, has a bowl portion to receive the discharged fluid, and a decorated sheet of dissolvable material is sized to be placed in the bowl portion. When the fluid is discharged onto the sheet, it disappears, thus making the simulated toilet event of greater interest to the child. The toy toilet preferably has a ledge in the bowl interior to support the sheet, and a drain opening with removable drain plug facilitates cleaning. The kit may also include toy training pants, with pull-ups loop tabs, a toy bottle for the fluid, and an instruction/storybook. Preferably, a plurality of dissolvable sheets are provided in the kit and are packaged in a matchbook style packet.

22 Claims, 3 Drawing Sheets

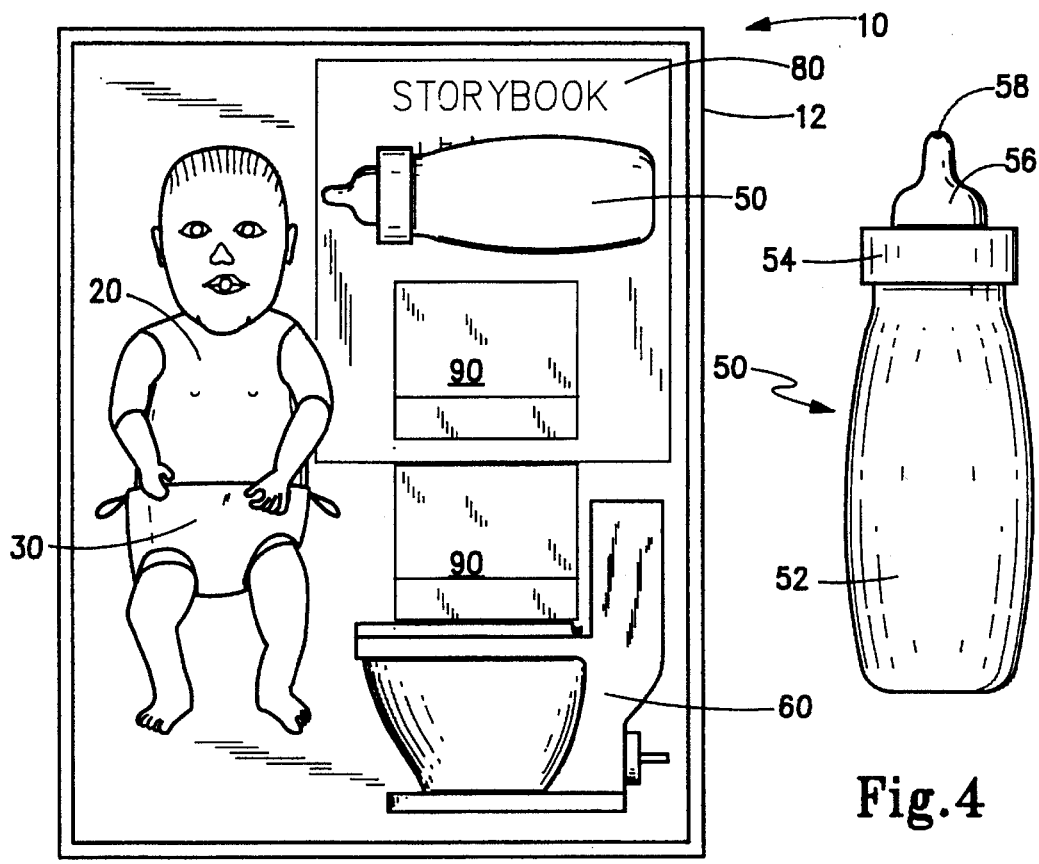
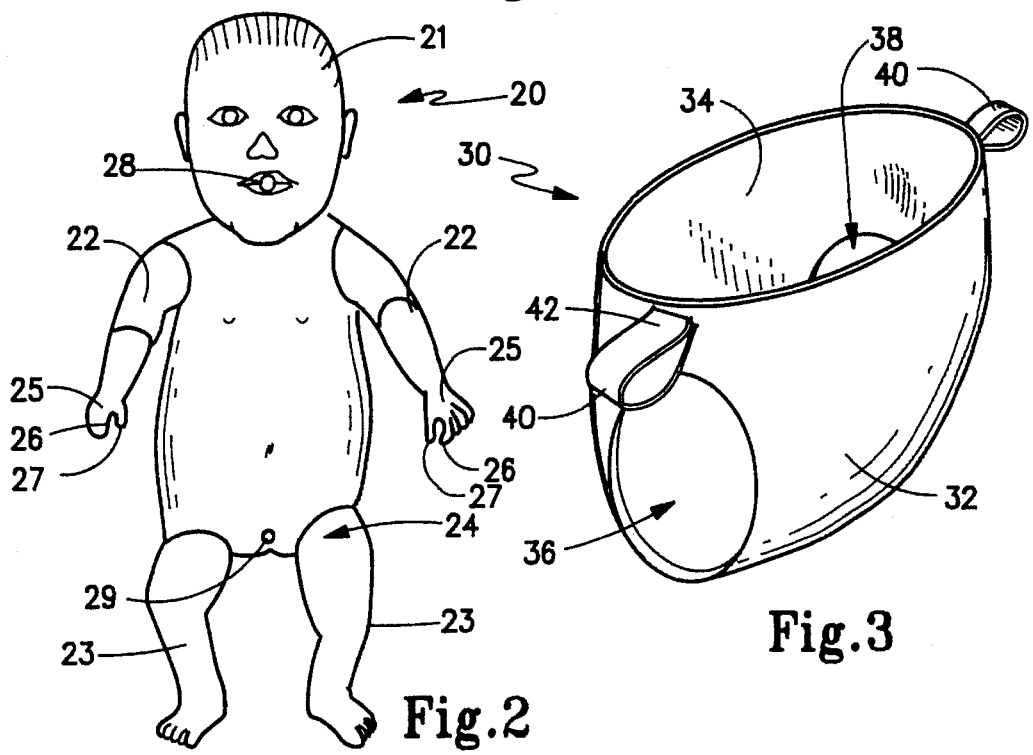

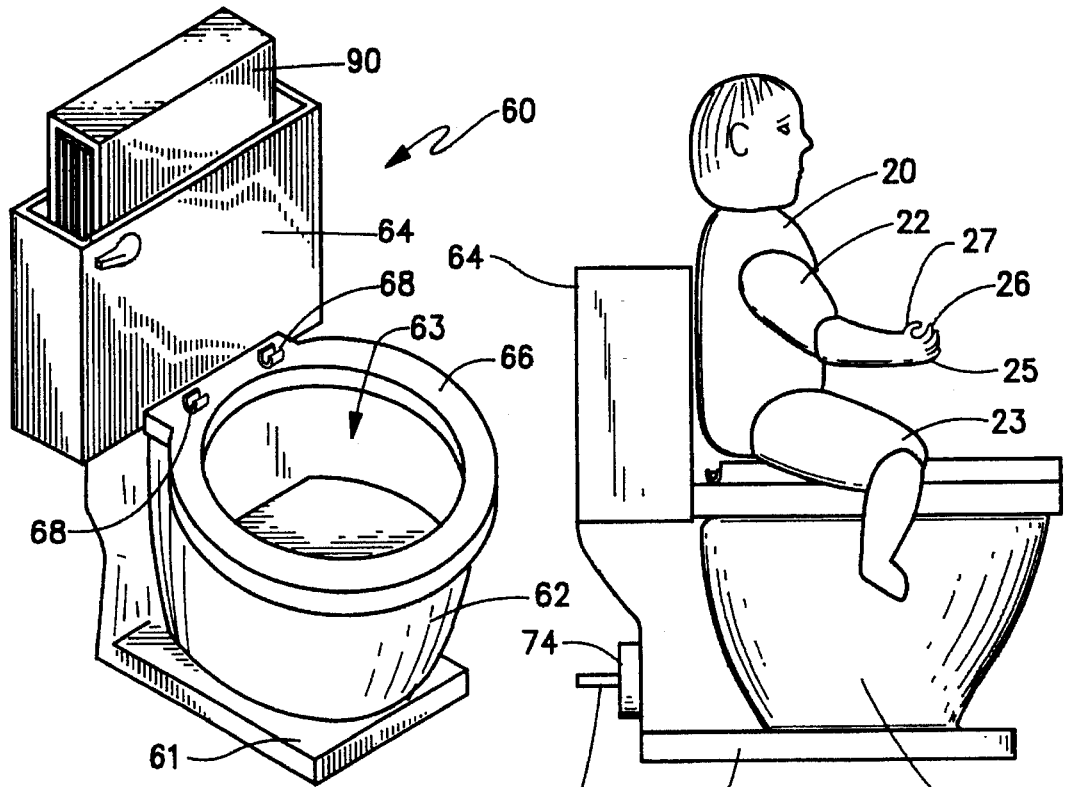
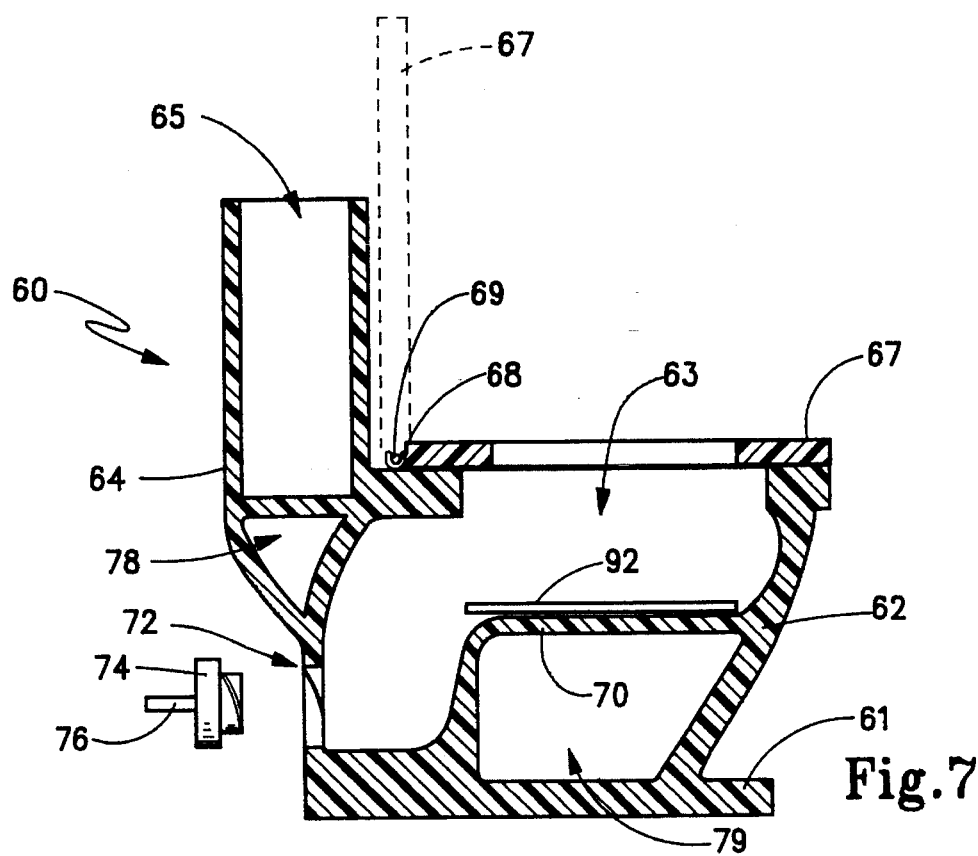

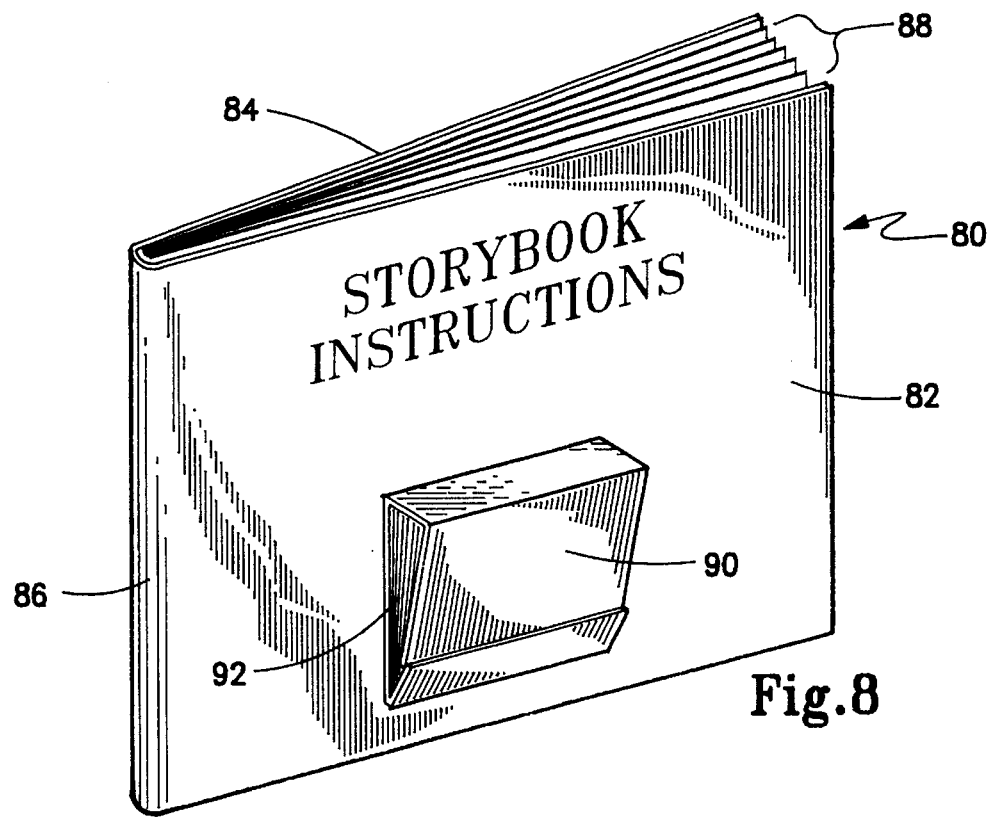
Fig.8
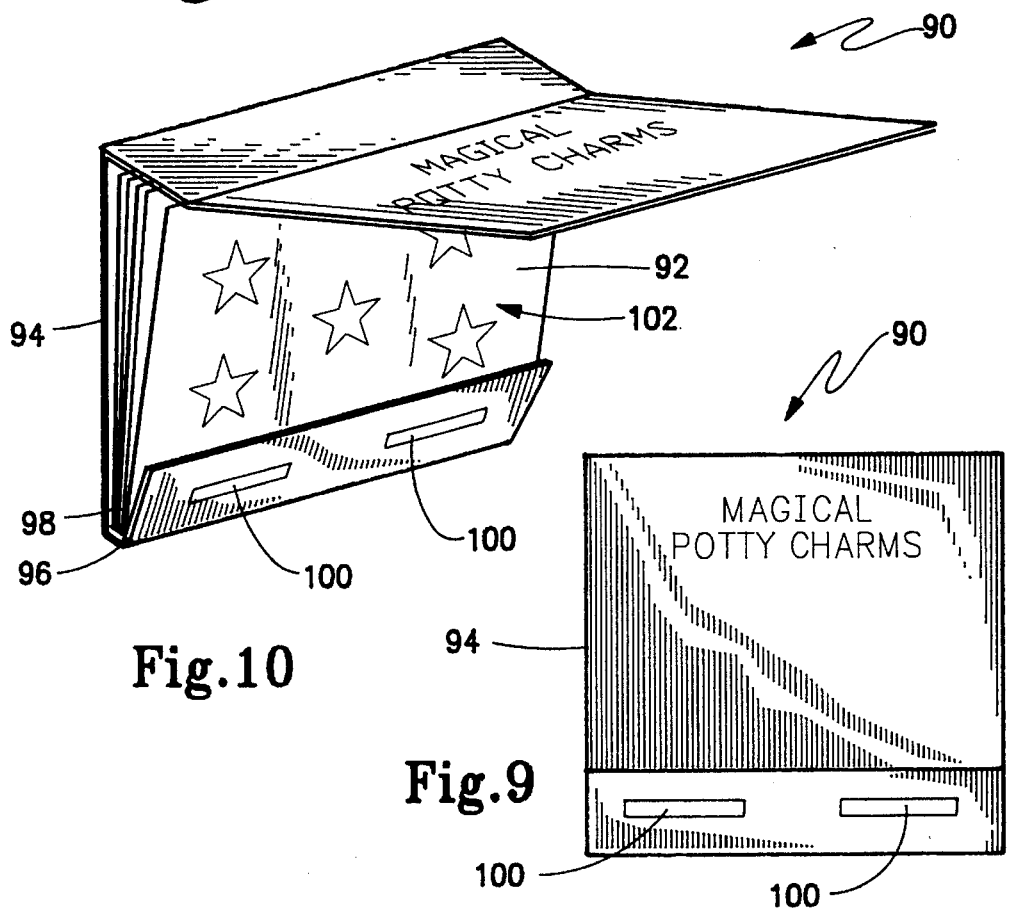
Fig.10
Fig.9

TOY TOILET TRAINING KIT

FIELD OF THE INVENTION

The present invention broadly concerns children's toys, but more specifically concerns an educational toy and system to help teach a child to use a toilet. The invention particularly contemplates an interactive system wherein a child, by playing with the components of the toy, transfers the play training experience to his/her toilet activities.

BACKGROUND OF THE INVENTION

Toilet training or potty training (potty and toilet shall hereinafter be considered reversible terms) has been a concern of parents since the beginning of time. Toilet training, of course, helps a child achieve control his/her excretory systems so that the child no longer needs as much care and attention during toilet activities, so that the child may eliminate the use of diapers and so that the child may have increased personal hygiene. However, the process of training a child in toilet activities often frustrates even the most patient of parents. A primary reason for this is that the concept of controlled toilet activities is a radical departure from the child's previous approach to extractatory functions. Frustration is further compounded by the child's limited verbal skills so that it is difficult for the parent to communicate to the child the toilet technique.

In the past, a child was typically introduced to the idea of potty training by watching adults use the toilet. One system for training a child suggested that the child be placed on the toilet every fifteen minutes for a period of five minutes each. At such time that the child eliminates either feces or urine the parent praises the child in order to reinforce use of the toilet. Another system relies upon the parents observing warning signals of an intending bowel movement with such signals being grunting or straining by the child or the child turning red in the face. When such warning signals are observed, the parent places the child on the potty to complete the excretion. In either event, the child's toilet may be an adult toilet, a specially adapted seat to place on an adult toilet, or a special "child size" toilet.

Few children toilet train in a matter of days or even weeks, and toilet training usually takes a period measured in months. The lengths of training period often has to do with a child's lack of interest in sitting on the potty, especially since sitting on the potty takes the child away from other toys and entertainment. To counteract this, some training systems encourage the parent to place one or more floatable toys in the toilet to entertain the child. These toys are both inconvenient and somewhat unsanitary since they come in contact with urine and fecal matter. This is especially unpleasant and unsanitary since the parent must remove the toys from the fouled water prior to flushing the toilet.

To avoid some of the drawbacks of the previous systems and to make a toilet training experience more entertaining to a child, a new and useful toilet training system was developed as set forth in U.S. Pat. No. 5,285,540, assigned to the assignee of the present invention and issued to Lawrence Putz on Feb. 15, 1994. In this toilet training system, decorated sheets which are fabricated from material that dissolves upon contact with urine are provided so that these sheets may be placed in a toilet in such a position that, when the child eliminates urine in the toilet, the sheet dissolves. A chart is provided for recording a child's use of the toilet for elimination, and instructions are provided first for positioning one of the dissolvable sheets and secondly for recording the child's elimination of urine on the chart. Accordingly, the child becomes more interested in using the toilet because the child causes the sheet to disappear by eliminating urine in the toilet. This, of course, is more exciting to the child and, with the use of the chart, makes the toilet experience a pleasing, interactive exercise with the parent.

While the toilet training system described in the Putz U.S. Pat. No. '540 has been recognized as an advantageous approach in teaching a child toilet techniques, there is still remains some communication barrier between the parent and child even with this system. Accordingly, there is still a need for potty training system which can be used alone or in combination with the toilet training system described in the Putz invention, which can help a parent communicate the concept of toilet activities to a child even absent comprehensive verbal skills.

SUMMARY OF THE INVENTION

It is an object of the present invention to provide a new and useful toilet training system to help teach children use of an adult toilet.

Another object of the present invention is to provide a toilet training kit having components with which the child interacts to help learn toilet training.

Another object of the present invention is to provide a toilet training kit which simulates a child's interest through parental roll playing and, in so doing, helps communicate the experience of toilet training to the child without relying on verbal communication.

Yet another object of the present invention is to provide a toilet training kit which is fun to play with for the child and wherein the child may subconscienciously transfer a toilet training experience to his/her own use.

Still a further object of the present invention is to provide a toilet training system and kit therefor wherein a parent may interact in a positive manner with the child in order to communicate use of the toilet with nonverbal communication techniques.

According to the present invention, then, a toilet training kit is provided and is adapted to instruct children in the use of a standard-sized human toilet. In its broad form, the toilet training kit includes a doll that is operative to receive a fluid and is operative to selectively discharge the fluid in simulation of urination. A toy toilet is included with this toilet being sized and adapted to interface with the doll whereby the doll and the toilet are proportional in size to a human and the standard-sized human toilet. This toy toilet has a bowl portion with an interior into which a child may selectively cause the doll to discharge the fluid, with the bowl portion being operative to receive and retain the fluid discharge therein. Finally, the kit includes at leat one, but preferably a plurality of units of dissolvable material constructed to dissolve on contact with the fluid. Each unit is sized and adapted to be placed in the bowl portion of the toy toilet whereby a child may selectively cause the doll to discharge the fluid onto the unit of material in a simulated toilet activity and thereby observe the disappearance of the unit of dissolvable material.

The doll used with this kit may either be a male doll or a female doll, but preferably is a unisex doll. The doll has a mouth opening adapted to receive the fluid and an outlet located in a genital region of the doll with this outlet being in fluid communication with the mouth opening. Thus, fluid may be introduced through the mouth opening and conveyed to the outlet to simulate urination. The doll may be resilient and squeezeable so that the child may squeeze the doll to discharge fluid from the outlet. Furthermore, a bottle, such as a toy baby's bottle, may be included. This bottle is operative to store the fluid and includes a nipple portion adapted to introduce the fluid into the doll, particularly through the mouth opening. Moreover, the doll has hands with at least one distinct digit on each hand thereof, and the kit may include a pair of toy training pants sized to fit on the doll, in the genital region. The toy training pants include a pair of oppositely disposed pull-tabs, in the form of loops, sized to be engaged by the digits of the doll's hand so that the doll may be manipulated to pull on the toy training pants.

The toy toilet of the present invention also includes a chamber portion that defines a support sized and adapted to support and store a plurality of units of the dissolvable material. This chamber portion may be configured to simulate the tank of an standard toilet. A ledge portion may be formed in the interior of the bowl portion with this ledge operative to support a unit of the dissolvable material. Here, the ledge is preferably located at a forward region of the interior bowl portion and may be oriented in parallel to a base that is adapted to support the toilet on a support surface. A drain opening may be provide, for example, at the rear of the toilet bowl, with this drain opening being in fluid communication with the interior of the bowl portion. Thus fluid which is discharged into the interior can be drained through the drain opening. A plug is removably secured to selectively seal the drain opening. The toy toilet may also include an annular seat pivotally secured thereto.

Preferably, the fluid used with the toilet training kit is water. Accordingly, the dissolvable material is a material which dissolves in water and, for example, may be of a composition not less than 50% carboxymethyl cellulose. Where a plurality of units are of the dissolvable material are provided, they may be joined together in a packet and may be individually removed from the packet for use. The packet may include a cover, and, in an exemplary embodiment, this cover is configured as a foldable "matchbook" style enclosure. Each unit of material then has a decorative design thereon, with the decorative design being formed out of a water soluble ink.

Finally, the kit may include an instruction book which has instructions for an adult for assisting a child in use of the doll, the unit of material and the toy toilet. This instruction book may also include a narrative story having instructions for the child to follow in using the doll, the unit of material and the toy toilet. Where a plurality of units of the dissolvable material are included and are joined together in a packet, the packet may be mounted on the instruction book.

These and other objects of the present invention will become more readily appreciated and understood from a consideration of the following detailed description of the exemplary embodiments when taken together with the accompanying drawings, in which:

BRIEF DESCRIPTION OF THE DRAWINGS

FIG. 1 is a front view in elevation of a toy toilet training kit according to the present invention;

FIG. 2 is a front plan view of a doll used in the toilet training kit of FIG. 1;

FIG. 3 is a perspective view of a pair of toy training pants used with the doll of FIG. 2;

FIG. 4 is a front view in elevation of a fluid bottle provided in the toilet training kit of FIG. 1 and used to store a fluid for introduction into the doll;

FIG. 5 is a perspective view of an exemplary embodiment of a toy toilet provided in the toy toilet training kit of FIG. 1;

FIG. 6 is a side view in elevation showing the toilet bowl of FIG. 5 with the doll of FIG. 2 placed thereon;

FIG. 7 is a side view in cross-section of the toy toilet shown in FIG. 5 with the drain plug removed therefrom;

FIG. 8 is a perspective view of an instruction and storybook used with the toilet training kit of FIG. 1 and showing a packet of a plurality of units of dissolvable material secured thereto;

FIG. 9 is a front view in elevation of a packet of units of dissolvable material used with the toilet training kit of FIG. 1, with the packet being in a closed position; and FIG. 10 is a perspective view showing a packet of units of dissolvable material, with the packet being in an open position.

DETAILED DESCRIPTION OF THE EXEMPLARY EMBODIMENTS

The present invention is directed to a toy toilet training kit which is adapted for use in instructing children in the use of a standard-sized human toilet. This toy toilet training kit may include a plurality of components and, while a variety of components are described, it should be appreciated that certain components, while described with respect to the exemplary embodiment, are nonetheless secondary or optional. Broadly, the toy toilet training kit according to the present invention includes three primary components (1) a doll that is operative to receive a fluid and is operative to selectively discharge the fluid in simulation of urination; (2) a toy toilet sized and adapted to interface with the doll and which is in proportion relative to the doll as a person is to a standard-sized human toilet; and (3) at least one unit or sheet of dissolvable material that is composed to dissolve upon contact with fluid and which may be placed in a bowl portion of the toy toilet. The remaining components are useful for the overall toy toilet training kit, but may be deemed as more secondary or optional, auxiliary features.

A toy toilet training kit including both the primary and secondary components is best shown in FIG. 1. Here, toy toilet training kit 10 is shown packaged in a box 12, although it should be understood that other types of packaging are within the scope of the present invention. Toy toilet training kit 10 includes a doll 20 which is wearing a pair of toy training pants 30. A fluid bottle 50 is also packaged in box 12 as part of toy toilet training kit 10, and the kit includes a toy toilet 60 described more thoroughly below. An instruction/storybook 80 is included as are two packets 90 of units of dissolvable material described more thoroughly below. As is shown in FIG. 1, one of the packets 90 is secured to instruction/storybook 80 while the other is not so secured.

With reference to FIG. 2, doll 20 may be seen to include a head 21, arms 22 and legs 23 extending from a pelvic or genital region 24. Arms 22 terminate in hands 25 each having distinct digits in the form of fingers 26 and thumbs 27. Head 21 includes a mouth opening 28 which is in fluid communication with an outlet 29 located in the genital region 24 of doll 20. While doll 20 could be formed as a male or female doll, it is preferably a unisex doll. In any event, doll 20 is operative to receive a fluid, preferably water, through mouth opening 28 and is operative to selectively discharge this fluid out of outlet 29 in simulation of urination. Thus, the fluid is conveyed by tubing (not shown) from mouth opeing 28 to outlet 29, as is known in the art.

Also as is known in the art, it is preferred that doll 20 be formed of a resilient material and be squeezeable to cause a discharge of fluid out of outlet 29 so that a child may selectively cause fluid to be discharged in simulation of urination.

As is shown in FIG. 3, a pair of training pants 30 is provided with toy toilet training kit 10 and, in FIG. 1, it may be seen that training pants 30 are positioned on doll 20 to cover the genital region 24. With reference to FIG. 3, though, it may be seen that training pants 30 includes a front panel 32 and a rear panel 34 which are joined together to provide a pair of leg openings 36 and an annular waist band 38. A pair of pull-tabs 40 are disposed on waist band 38 and project oppositely from one another on the exterior of training pants 30. Each of pull-tabs 40 is mounted above a respective leg opening 36 and is sized to be engaged by one of the free digits (fingers 26 or thumbs 27) of doll 20. Here, pull-tabs 40 are formed as a strip of material that is looped and is sewn, for example, by stitching 42 to training pants 30 on waist band 38 thereof. It should be appreciated that a child, with or without the assistance of an adult, as necessary, may engage pull-tabs 40 with the free digits on hands 25 of doll 20 and manipulate arms 22 to cause the doll to pull on toy training pants 30. To this end, doll 20 should be articulated, as is known in the art, to permit such manipulation.

As noted above, doll 20 is operative to receive a fluid, such as water, in order to simulate drinking and urination. To introduce the fluid into the doll 20 through mouth opening 28, a toy baby's bottle 50 is provided, as is best shown in FIG. 4. Here, bottle 50 includes an enclosure 52 that is sealed by means of a removable cap 54 that has a nipple portion 56 disposed thereon. Nipple portion 56 includes a port 58 to allow passage of fluid that is received and stored in enclosure 52. Moreover, nipple 56 is sized to be inserted into mouth opening 58 of doll 20, again, as is known in the art.

Toy toilet training kit 10 includes, as a primary component thereof, a toy toilet 60, best shown in FIGS. 5–7. It should be noted in reference to FIG. 6 that toy toilet 60 and doll 20 are proportionalized so that they may be approximately the same in proportion to a human and a standard-sized human toilet. As is shown in these figures, toy toilet 60 includes a bowl portion 62 having an interior 63 with bowl portion 62 being supported by means of a base 61 on any convenient support surface. A chamber portion 64 is located rearwardly of bowl portion 62 and is positioned and configured to simulate the tank of a standard toilet. Chamber portion 64 has an interior 65 and defines a support that is sized and adapted to support and store a plurality of units of dissolvable material, especially when packaged as packet 90 shown in FIG. 5. Bowl 62 terminates in annular upper rim 66, and an annular seat 67 may be pivotally mounted by brackets 68 disposed on rim 66. Here, for example, as is shown in FIG. 7, annular seat 68 includes a pair of oppositely projecting trunnion pins, such as pins 69, which are received in brackets 68 so that seat 67 may be pivoted between the "down" position and the "up" position (shown in phantom).

A ledge 70 is formed at a forward portion of bowl 62 and is disposed on the interior 63 thereof. Ledge 70 is preferably oriented parallel to base 61 and is sized and adapted to support a unit or sheet 92 of the dissolvable material, as described more thoroughly below. When doll 20 is placed on toy toilet 60, as shown in FIG. 6, the discharge of fluid from outlet 29 is thus directed toward ledge 70, and thus sheet 92 placed thereon, so that the fluid will contact sheet 92. In order to remove the fluid from interior 63 after such discharge, a drain opening 72 is formed rearwardly through bowl 62 of toy toilet 60 and is threaded to receive a threaded plug 74 so that plug 74 may be secured in drain opening 72 to seal interior 63 or, alternatively, can be removed from drain opening 72 to allow draining of fluid from interior 63 thereby facilitating cleaning of toy toilet 60. In order to facilitate insertion and removal of drain plug 74, an enlarged flange 76 is provided that is easier for a child to grip with his/her fingers. Cavities 78 and 79 are provided, as is shown in FIG. 7, to reduce the amount of material, such as molded plastic, out of which toy toilet 60 is fabricated.

Toy toilet training kit 10 may also include an instruction/storybook 80, as noted above. With reference to FIG. 8, it may be seen that this representative instruction/storybook 80 includes a front cover 82 and a back cover 84 secured along a binding 86 in order to bind a plurality of leaves or pages 88 therebetween. Instruction book 80 preferably includes two types of instructions. First instructions are provided to instruct an adult in a teaching method for assisting a child in use of the doll 20, a unit of the dissolvable material and toy toilet 60. Also, it is preferred that the instruction/storybook 80 includes second instructions for the child to follow in using the doll, the dissolvable sheet of material and toy toilet 60. Here, it is preferred that the instructions for the child be in a narrative or "storybook" format which will allow the child to play act with doll 20 in order to teach doll 20 how to use toy toilet 60 and use the toy training pants 30. As is also shown in FIG. 8, instruction/storybook 80 may have a packet 90 of sheets or units 92 of dissolvable material disposed thereon. Packet 90 may be secured permanently to front cover 82 or may be releasably secured, for example, by a tacky, releasably and reusable adhesive.

Whether secured to front cover 82 of instruction/storybook 80, as is shown in FIGS. 1 and 8, or simply contained loose in toy toilet training kit 10, a representative packet 90 of a disposable sheets of material are shown in FIGS. 9 and 10. In these figures, it can be seen that packet 90 includes a cover 94 which is a "matchbook" style cover which has a lip 96 that receives edge margin 98 of a plurality of sheets or units 92 of the dissolvable material. Margin 98 of units 92 may be fastened by means of staples 100 so that they are retained within cover 94. In FIG. 9, cover 94 is closed but, as is shown in FIG. 10, it may be opened to allow access to units 92. Units 92 are shown to be printed with a decorative design, such as by means of a water soluble ink, with there being a design 102 in the form of "stars" shown in FIG. 10. Each individual unit 92 may be consecutively removed from packet 90 for use with toy toilet 60. Preferably, the design is printed in a water soluable ink, and units 92 are coposed of a material that is at least fifty percent (50%) carboxymethyl cellulose.

In use, then, a child is instructed to place toy toilet 60 on any suitable support surface. The child then removes a unit 92 of disposable material and places it on ledge 70 of toy toilet 60, as is shown in FIG. 7. Next, the child may "feed" doll 20 with fluid, such as water, by first filling bottle 50 with the fluid and then inserting nipple 56 in mouth opening 28 discharging at least some of the fluid contents of bottle 50 into mouth opening 28. This fluid is then conveyed so that it may be discharged through outlet 29. Here, the child is instructed to place the doll in seated fashion, as is shown in FIG. 6, or, alternatively, to stand the doll immediately in front of bowl 62 facing rearwardly, that is, toward chamber portion 64. The child is then instructed to squeeze doll 20 thereby causing doll 20 to discharge the fluid out of outlet 29 and onto the sheet 92 of dissolvable material placed on ledge 70. It should be appreciated that, at this time, plug 74 should be in position so that interior 63 collects the fluid which also causes unit 92 to dissolve. The child may see and be excited by the disappearance of unit 92. Either the child or preferably the child with assistance from the parent may then rinse interior 63 of toy toilet 60 and, to this end, plug 74 may be removed to facilitate the cleaning process.

From the foregoing, it should be appreciated that, with this toy toilet training kit, the act of elimination of waste into a human toilet may be suggested. Indeed, through this interactive experience, a child may transfer his/her play time activity to his/her own use of a human toilet. This system, in conjunction with other toilet training systems, especially that described in U.S. Pat. No. 5,285,540, will be more readily implemented by a child in his/her own toilet training.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiment of the present invention without departing from the inventive concepts contained herein.

I claim:

1. A toy toilet training kit adapted to instruct children in the use of a standard size human toilet, comprising:
   (a) a doll that is operative to receive a fluid and is operative to selectively discharge said fluid in simulation of urination;
   (b) a toy toilet sized and adapted to interface with said doll whereby said doll and said toy toilet are proportional in size to a human and said standard size human toilet, said toy toilet having a bowl portion having an interior into which a child may selectively cause said doll to discharge said fluid, said bowl portion operative to receive and retain said fluid discharged therein; and
   (c) a unit of dissolvable material constructed to dissolve on contact with said fluid, said unit sized and adapted to be placed in said bowl portion of said toy toilet whereby a child may selectively cause said doll to discharge said fluid onto said unit in a simulated toilet activity and thereby observe the disappearance of said unit.

2. A toy toilet training kit according to claim 1 wherein said toy toilet has a chamber portion forming a support sized and adapted to support and store a plurality of units of said dissolvable material.

3. A toy toilet training kit according to claim 2 wherein said chamber portion is configured to simulate a tank of said standard toilet.

4. A toy toilet training kit according to claim 1 wherein said toy toilet includes a ledge portion located in the interior of said bowl portion, said ledge operative to support said unit.

5. A toy toilet training kit according to claim 4 wherein said ledge is located at a forward region of the interior of said bowl portion.

6. A toy toilet training kit according to claim 5 wherein said toy toilet has a base adapted to be supported on a support surface, said ledge being oriented parallel to said base.

7. A toy toilet training kit according to claim 1 wherein said toy toilet includes a seat pivotally secured relative to said bowl portion.

8. A toy toilet training kit according to claim 1 wherein said toy toilet has an drain opening in fluid communication with the interior of said bowl portion whereby fluid discharged into the interior can be drained therefrom, and including a plug removably securable to selectively seal the drain opening.

9. A toy toilet training kit according to claim 1 wherein said doll is operative to receive water as said fluid.

10. A toy toilet training kit according to claim 1 wherein said doll is a unisex doll.

11. A toy toilet training kit according to claim 1 wherein said doll has a mouth opening adapted to receive the fluid and an outlet located in a genital region thereof, said outlet in fluid communication with the mouth opening whereby fluid may be introduced through the mouth opening and conveyed to the outlet to simulate a toilet experience.

12. A toy toilet training kit according to claim 11 wherein said doll is resilient and squeezable to discharge fluid from the outlet.

13. A toy toilet training kit according to claim 1 including a bottle operative to store said fluid and including a nipple portion adapted to introduce said fluid into said doll.

14. A toy toilet training kit according to claim 1 wherein said doll has at least one distinct digit on each of a hand thereof and including a pair of toy training pants sized to fit on said doll, said toy training pants including a pair of oppositely disposed pull tabs sized to be engaged by said digits whereby said doll may be manipulated to pull on said toy training pants.

15. A toy toilet training kit according to claim 1 including an instruction book including instructions for an adult in assisting a child in use of said doll, said unit of material and said toy toilet.

16. A toy toilet training kit according to claim 15 wherein said instruction book includes a narrative story having instructions for the child to follow in using said doll, said unit of material and said toy toilet.

17. A toy toilet training kit according to claim 15 including a plurality of units of said material joined together in a packet and individually removable from said packet for use, said packet mounted on said instruction book.

18. A toy toilet training kit according to claim 1 including a plurality of units of said material joined together as a single packet.

19. A toy toilet training kit according to claim 18 including a cover for said packet.

20. A toy toilet training kit according to claim 19 wherein said cover is configured as a foldable matchbook style enclosure.

21. A toy toilet training kit according to claim 1 wherein said unit of material is provided with a decorative design thereon, the decorative design being formed out of water soluble ink.

22. A toy toilet training kit according to claim 1 wherein said unit of material has a composition not less than fifty percent carboxymethyl cellulose.

* * * * *